(12) United States Patent
Chang et al.

(10) Patent No.: US 11,288,470 B2
(45) Date of Patent: Mar. 29, 2022

(54) SCANNING DEVICE AND METHOD OF AUTOMATICALLY TRIGGERING OPERATION THROUGH SPECIFIC MOTION TRAJECTORY

(71) Applicant: Quanta Computer Inc., Taoyuan (TW)

(72) Inventors: Jung-Wen Chang, Taoyuan (TW); Chien-Hung Lin, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

(21) Appl. No.: 16/828,871

(22) Filed: Mar. 24, 2020

(65) Prior Publication Data

US 2021/0157995 A1 May 27, 2021

(30) Foreign Application Priority Data

Nov. 27, 2019 (TW) .................... 108143266

(51) Int. Cl.
*G06K 7/10* (2006.01)
*G06K 7/14* (2006.01)

(52) U.S. Cl.
CPC ....... *G06K 7/10722* (2013.01); *G06K 7/1413* (2013.01); *G06K 2007/10524* (2013.01); *G06K 2007/10534* (2013.01)

(58) Field of Classification Search
CPC ............. G06K 7/10722; G06K 7/1413; G06K 2007/10524; G06K 2007/10534
See application file for complete search history.

(56) References Cited

U.S. PATENT DOCUMENTS

| 2014/0097247 A1* | 4/2014 | Zumsteg | G06K 7/10386 235/440 |
| 2015/0016139 A1* | 1/2015 | Gerst, III | G06K 7/10732 362/551 |
| 2016/0012388 A1* | 1/2016 | Zumsteg | G06K 7/10009 235/385 |
| 2017/0328997 A1 | 11/2017 | Silverstein et al. | |

FOREIGN PATENT DOCUMENTS

| CN | 204440411 U | 7/2015 |
| CN | 105991154 A | 10/2016 |
| CN | 106325467 A | 1/2017 |
| CN | 109190433 A | 1/2019 |
| TW | 201805857 A | 2/2018 |

OTHER PUBLICATIONS

P. Vorst, B. Yang and A. Zell, "Loop closure and trajectory estimation with long-range passive RFID in densely tagged environments," 2009 International Conference on Advanced Robotics, 2009, pp. 1-6. (Year: 2009).*

* cited by examiner

*Primary Examiner* — Matthew Mikels
(74) *Attorney, Agent, or Firm* — Rabin & Berdo, P.C.

(57) ABSTRACT

A method of automatically triggering scanning operation through specific motion includes steps as follows. A specific motion trajectory of a scanning device is sensed to determine whether the scanning device is moved along a predetermined path. If so, an image sensor of the scanning device is switched on. A determination is made as to whether the scanning device is moved down to a lower position. If so, the image sensor of the scanning device is switched off.

8 Claims, 3 Drawing Sheets

SCANNING DEVICE AND METHOD OF AUTOMATICALLY TRIGGERING OPERATION THROUGH SPECIFIC MOTION TRAJECTORY

RELATED APPLICATIONS

This application claims priority to Taiwan Application Serial Number 108143266, filed Nov. 27, 2019, which is herein incorporated by reference.

BACKGROUND

Field of Disclosure

The disclosure relates to a scanning device. More particularly, the disclosure relates to a barcode scanning device capable of being automatically triggered through specific motion trajectories.

Description of Related Art

With the quick development of the logistics industry as present, people's demand for logistics business is getting increased, and the processing speed for logistics are also becoming higher and higher.

However, since a logistics operator needs to use one hand to hold a scanning device for scan barcodes on the goods. Thus, not only the efficiency is not outstanding, the processing time of the operator is increased, but also the disadvantage of both hands not available at the same time is highlighted.

SUMMARY

One aspect of the present disclosure is to provide a scanning device and a method of automatically triggering scanning operation through specific motion trajectory to solve the aforementioned problems of the prior art.

In one embodiment of the disclosure, a method of automatically triggering scanning operation through specific motion trajectory includes steps as follows. A specific motion trajectory of a scanning device is sensed to determine whether the scanning device is moved along a predetermined path. When it is determined that the scanning device is moved along the predetermined path, an image sensor of the scanning device is switched on. A determination is made as to whether the scanning device is moved down to a lower position. When it is determined that the scanning device is moved down to the lower position, the image sensor of the scanning device is switched off.

In another embodiment of the disclosure, a scanning device includes a wearing portion, a device body, an image sensor, a wireless transmission device, an attitude sensor and a controller. The wearing portion is configured to be worn on a human hand. The device body is fixed on the wearing portion. The image sensor is disposed on the device body for scanning a barcode image. The wireless transmission device is disposed within the device body for transmitting data outwardly to an external device. The attitude sensor is disposed within the device body for sensing a motion trajectory of the device body. The controller is electrically connected to the attitude sensor, the image sensor and the wireless transmission device, and is configured to determine whether the image sensor of the scanning device is switched on according to the motion trajectory of the device body, and transmit the data outwardly to the external device through the wireless transmission device.

Thus, through the construction of the embodiments above, the disclosure not only can totally save the operation time that a scanning button of the scanning device being pressed multiple times spends, thereby improving the work efficiency and reducing the processing time of the personnel, but also meet the requirements to free both hands at the same time during the scanning process.

The above description is merely used for illustrating the problems to be resolved, the technical methods for resolving the problems and their efficacies, etc. The specific details of the disclosure will be explained in the embodiments below and related drawings.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure. In the drawings.

DESCRIPTION OF THE EMBODIMENTS

Figure 1:
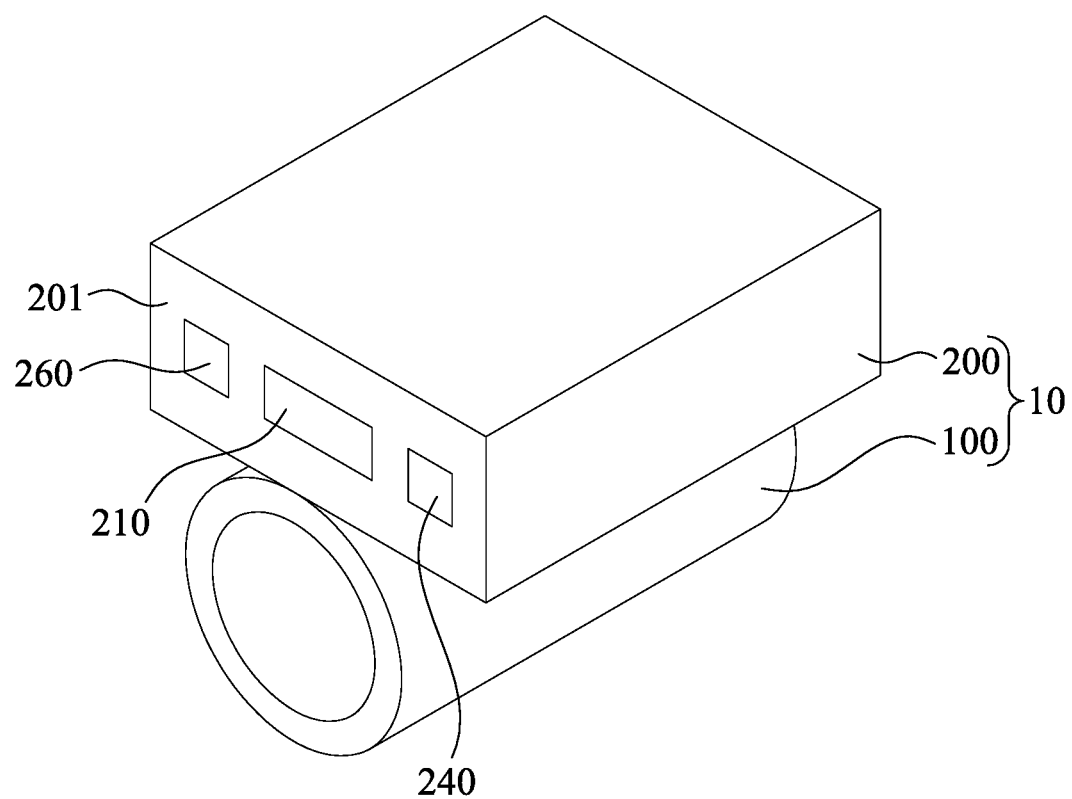
FIG. 1 is a schematic view of a scanning device according to one embodiment of the disclosure.

Reference will now be made in detail to the present embodiments of the disclosure, examples of which are illustrated in the accompanying drawings. Wherever possible, the same reference numbers are used in the drawings and the description to refer to the same or like parts. According to the embodiments, it will be apparent to those skilled in the art that various modifications and variations can be made to the structure of the disclosure without departing from the scope or spirit of the disclosure.

Figure 2:
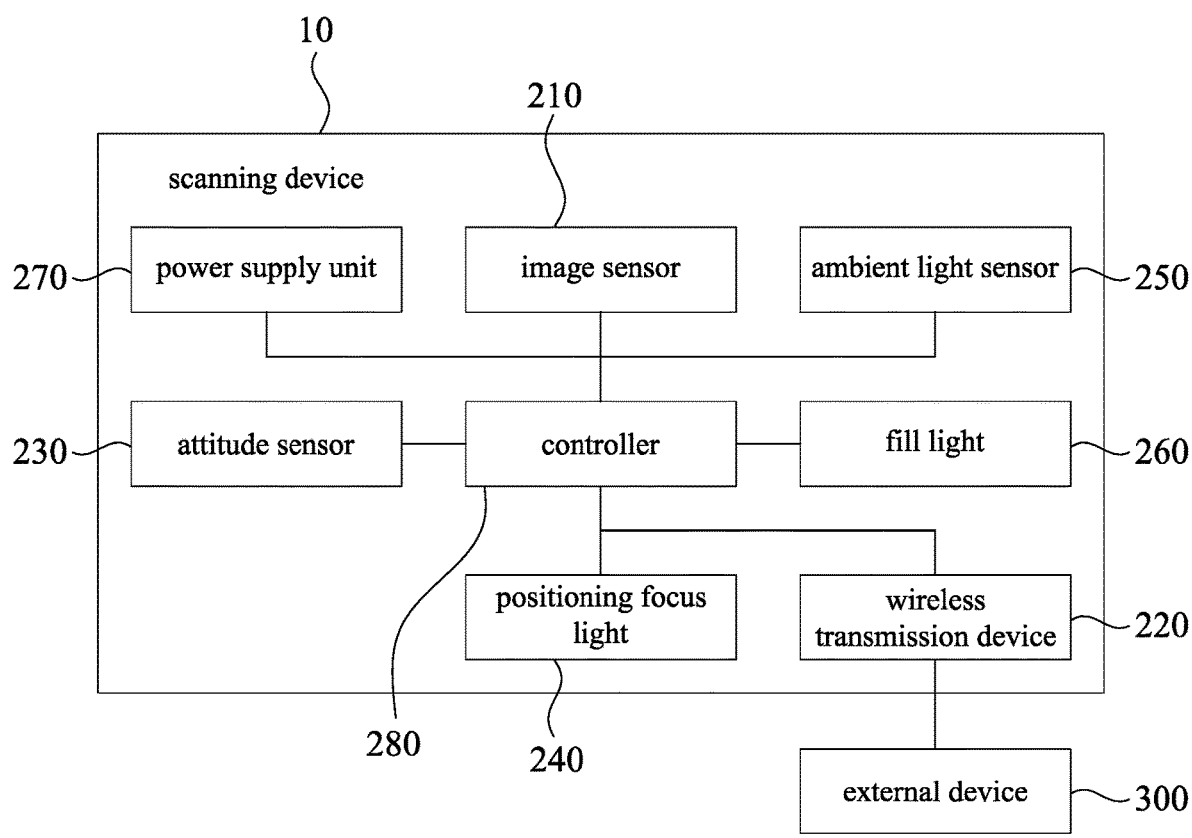
FIG. 2 is a block diagram of the scanning device of FIG. 1.

Reference is now made to FIG. 1 and FIG. 2, in which FIG. 1 is a schematic view of a scanning device 10 according to one embodiment of the disclosure, and FIG. 2 is a block diagram of the scanning device 10 of FIG. 1. As shown in FIG. 1 and FIG. 2, in this embodiment, the scanning device 10 includes a wearing portion 100, a device body 200, an image sensor 210, a wireless transmission device 220, an attitude sensor 230 and a controller 280. The wearing portion 100 is used to be worn on a human hand. The device body 200 is fixed on the wearing portion 100. The image sensor 210 is disposed within the device body 200, and partially exposed outwards from a front side 201 of the device body 200 for scanning a barcode image. The wireless transmission device 220 is disposed within the device body 200 for transmitting data outwardly to an external device 300 (e.g., a smartphone, laptop computer or a cloud server etc.). The wireless transmission device 220 is, for example, a Bluetooth or WIFI device. The attitude sensor 230 is disposed within the device body 200 for sensing a motion trajectory of the device body 200. The controller 280 is electrically connected to the attitude sensor 230, the image sensor 210 and the wireless transmission device 220, and the controller 280 is used to determine whether the image sensor 210 of the scanning device 10 is switched on (i.e., turn on) according to the motion trajectory of the device body 200, and transmit the data outwardly to the external device 300 through the wireless transmission device 220.

More particularly, the scanning device 10 further includes a positioning focus light 240. The positioning focus light 240 is disposed within the device body 200, partially exposed outwards from the front side 201 of the device body 200, and electrically connected to the controller 280. The positioning focus light 240 is used to provide a scanning light pattern on the barcode image so as to simplify the recognition difficulty of the image sensor 210 when scanning the barcode image. It is noted, the controller 280 synchronously triggers the image sensor 210 and the positioning focus light 240 to be switched on or off. However, the disclosure is not limited thereto, and the scanning device 10 in other embodiments may be operated without the positioning focus light.

Also, the scanning device 10 further includes an ambient light sensor 250 and a fill light 260. The ambient light sensor 250 is disposed on the device body 200, and is electrically connected to the controller 280 for sensing the ambient light intensity of the ambient lights at site. The fill light 260 is disposed within the device body 200, and partially exposed outwards from the front side 201 of the device body 200, and electrically connected to the controller 280 to provide fill light.

Therefore, after the image sensor 210 is switched on by the controller 280, the controller 280 determines whether the ambient light intensity of the ambient lights conforms to a predetermined range. If it is determined that the ambient light intensity does not conform to the predetermined range, e.g., the ambient light intensity is insufficient to the predetermined range, the controller 280 then activates the fill light 260 for filling light. During the light-supplementary period, when it is determined that the ambient light intensity conforms to the predetermined range, the controller 280 switched off the fill light 260. It is noted that when the controller 280 switched off (i.e., shut down) the image sensor 210, the controller 280 switched off the fill light 260 synchronously.

For example, the attitude sensor 230 is an accelerometer. However, the disclosure is not limited thereto. The attitude sensor 230 in other embodiments may be substituted to a gyroscope, a magnetometer or the like, or a combination of any two or more of the accelerometer, the gyroscope, or the magnetometer.

The scanning device 10 further includes a power supply unit 270. The power supply unit 270 is located within the device body 200, and the power supply unit 270 is used to provide required working power to all electronic components of the scanning device 10, such as the image sensor 210, the wireless transmission device 220, the attitude sensor 230, the power supply unit 270, the positioning focus light 240, the ambient light sensor 250, the fill light 260 and the controller 280.

However, it is noted, when the image sensor 210 has not been switched on by the controller 280 yet, the power supply unit 270 does not provide working power for the image sensor 210 and the positioning focus light 240 temporarily. When the controller 280 switches off the image sensor 210, the power supply unit 270 stops providing working power to the image sensor 210 and the positioning focus light 240.

For example, the wearing portion 100 is a finger ring, and the finger ring is, for example, a ring type or a finger cover type, so that the scanning device 10 can be fixedly worn on the finger of a human hand. However, the disclosure is not limited thereto. In other embodiments, the wearing portion 100 may be substituted to a wristband of a watch or a bracelet to wear the scanning device 10 on the wrist of the human hand, or substituted to a glove or a palm strap to wear the scanning device 10 on the back of the human hand.

Figure 3:
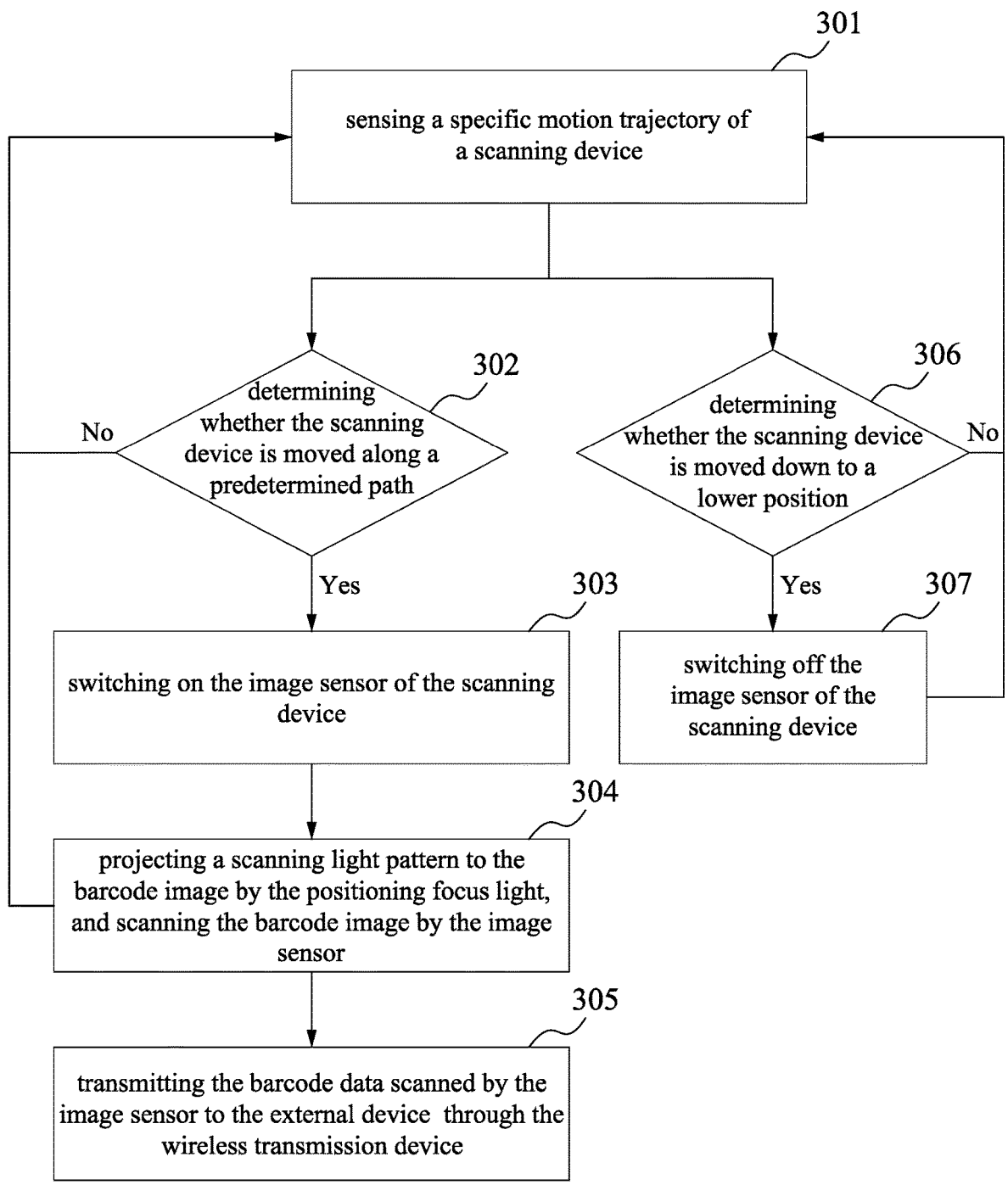
FIG. 3 is a method of automatically triggering a scanning operation on the scanning device through specific motion trajectory.

FIG. 3 is a method of automatically triggering a scanning operation on the scanning device 10 through specific motion trajectory. As shown in FIG. 1 and FIG. 3, in this embodiment, the method of automatically triggering scanning operation through specific motion trajectory includes Step 301 to Step 307 as follows. In Step 301, a specific motion trajectory of a scanning device 10 is sensed. Next, Step 302 and Step 306 are then performed. In Step 302, a determination is made as to whether the scanning device 10 is moved along a predetermined path. If yes, go to Step 303, otherwise, back to Step 301. In Step 303, the image sensor 210 of the scanning device 10 is switched on, and then the method goes to Step 304. In Step 304, a scanning light pattern is projected to the barcode image by the positioning focus light 240, and the barcode image can be scanned by the image sensor 210. Next, in Step 305, the barcode data scanned by the image sensor 210 is transmitted to the external device 300 through the wireless transmission device 220. In Step 306, a determination is made as to whether the scanning device 10 is moved down to a lower position. If yes, go to Step 307, otherwise back to Step 301. In step 307, the image sensor 210 is switched off.

In the above embodiment, for example, Step 302 further includes detailed steps as follows. First, a determination is made as to whether the scanning device 10 is moved upwardly to a specific position. If yes, a determination is then made as to whether the scanning device 10 is moved transversely to a code-scanning position from the specific position. If yes, the scanning device that is moved along the predetermined path is decided so as to trigger the image sensor 210 automatically. Therefore, Step 303 is performed next.

More specifically, the attitude sensor 230 senses the motion trajectory of the scanning device 10. For example, the attitude sensor 230 sequentially collects a plurality of motion trajectory data of the scanning device 10 (e.g., first motion trajectory data and second motion trajectory data). When the controller 280 determines whether the scanning device 10 is upwardly moved to the specific position, the controller 280 determines whether the aforementioned first specific motion trajectory data includes a Z-axial linear acceleration component that is a positive number. If yes, it means that the controller 280 has determined that the scanning device 10 is upwardly moved along a vertical direction (e.g., Z axis), and then whether the aforementioned second specific motion trajectory data includes a horizontal axial linear acceleration component. If yes, it means that the controller 280 has determined that the aforementioned second specific motion trajectory data includes a horizontal axial linear acceleration component. If yes, it means that the controller 280 has determined that the scanning device 10 is moved leftward or rightward from the specific position along the X axis or Y axis. For example, when the hand is lifted toward his chest or straight forward, it is determined that the scanning device 10 has moved along the predetermined path, and step 303 is performed.

For example, as shown in Table I, when a user's hand is raised to move the scanning device 10 upwardly, because the attitude sensor 230 sequentially detects multiple Z-axis acceleration values (e.g., linear acceleration Z-axis values of No. 1 to No. 8, Table I), the trend of these Z-axis acceleration values increasingly rises from lower values (i.e., zero, No. 1) to a higher value (i.e., 195, No. 5), and then decreasingly drops to another lower value (i.e., 1, No. 8).

Thus, it means that the scanning device 10 moves to the specific position from the bottom. These Z-axis acceleration values are collectively referred to as the aforementioned first motion trajectory data.

Then, when the user moves the scanning device 10 toward the chest or straightens forward away from chest, because the attitude sensor 230 sequentially detects multiple Y-axis acceleration values (e.g., linear acceleration Y-axis values of No. 9 to No. 15, Table I), and the trend of these Y-axis acceleration values increasingly rises from lower values (i.e., zero, No. 9) to a higher value (i.e., −82, No. 11), and then increasingly drops to another lower value (i.e., 0, No. 15). Thus, it means that the scanning device 10 moves from a specific position to a code-scanning position. These Y-axis acceleration values are collectively referred to as the above-mentioned second motion trajectory data.

TABLE I

| No. | linear acceleration (X-axis) | linear acceleration (Y-axis) | linear acceleration (Z-axis) |
|---|---|---|---|
| 1 | 0 | 0 | 0 |
| 2 | 0 | 0 | 0 |
| 3 | 32 | 12 | 104 |
| 4 | 21 | 8 | 146 |
| 5 | 10 | 0 | 195 |
| 6 | 9 | 0 | 89 |
| 7 | 0 | 0 | 34 |
| 8 | 0 | 0 | 1 |
| 9 | −23 | −56 | 0 |
| 10 | −15 | −78 | 5 |
| 11 | −21 | −82 | 3 |
| 12 | −15 | −43 | 1 |
| 13 | −9 | −16 | 0 |
| 14 | 0 | 0 | 2 |
| 15 | 0 | 0 | 0 |

More specifically, the attitude sensor 230 senses the motion trajectory of the scanning device 10. For example, the attitude sensor 230 sequentially collects a plurality of motion trajectory data (e.g., first motion trajectory data and second motion trajectory data) of the scanning device 10. Next, a determination is made as to whether the first motion trajectory data includes a horizontal axial angular acceleration component, and the horizontal axial angular acceleration component is a positive number. If yes, a determination is next made as to whether the second motion trajectory data includes a Z-axis angular acceleration component. If yes, it is to decide that the scanning device 10 has moved along the predetermined path, and then step 303 is performed.

TABLE II

| No. | linear acceleration (X-axis) | linear acceleration (Y-axis) | linear acceleration (Z-axis) |
|---|---|---|---|
| 1 | 0 | 0 | 0 |
| 2 | 2 | 12 | 5 |
| 3 | 1 | 67 | 3 |
| 4 | −2 | 103 | 1 |
| 5 | 3 | 84 | 0 |
| 6 | 0 | 41 | 2 |
| 7 | 1 | 12 | 0 |
| 8 | 0 | 0 | 1 |
| 9 | 3 | 5 | 0 |
| 10 | −2 | 2 | −12 |
| 11 | −3 | −3 | −57 |
| 12 | 2 | 0 | −96 |
| 13 | 4 | 2 | −63 |
| 14 | 0 | 1 | −14 |
| 15 | 1 | 0 | −2 |

For example, as shown in Table II, when the user's hand (i.e., thumb) rotates upward with the Y-axis as the reference, because the attitude sensor 230 sequentially detects multiple Y-axis angular acceleration values (e.g., angular acceleration Y-axis values of No. 1 to No. 8, Table II), the trend of these Y-axis acceleration values increasingly rises from lower values (i.e., zero, No. 1) to a higher value (i.e., 103, No. 4), and then increasingly drops to another lower value (i.e., 0, No. 8). Also, when the user's hand (i.e., thumb) rotates downward with the Z-axis as the reference, because the attitude sensor 230 sequentially detects multiple Z-axis angular acceleration values (e.g., angular acceleration Z-axis values of No. 9 to No. 15, Table II), the trend of these Z-axis acceleration values increasingly rises from lower values (i.e., zero, No. 9) to a higher value (i.e., −96, No. 12), and then increasingly drops to another lower value (i.e., −2, No. 15).

In the above-mentioned embodiment, as the scanning is completed, if the movement of the hand being moved down and not lifted again in a period of time is detected, it means that the barcode image of the package is done to be scanned. At this time, the image sensor 210 of the scanning device 10 is automatically switched off, so that the image sensor 210 is to enter a standby mode for saving the power of the scanning device 10. If the scanning task has not been completely done, the image sensor 210 of the scanning device 10 will not be switched off to remain in open state at this time.

For example, step 306 further includes several detailed steps as follows. First, motion trajectory data of the scanning device 10 is collected, next, a determination is made as to whether the scanning device 10 is moved down to a lower position, for example, a determination is made as to whether the motion trajectory data having a Z-axial linear acceleration component which is a negative number. If, yes, a determination is then made as to whether the scanning device 10 is stationary at the lower position in a period of time (e.g., 2 seconds), otherwise, back to Step 301. If it is determined that the scanning device 10 is still stationary at the lower position in the period of time, it is decided that the scanning device 10 is temporarily unused, and then go to Step 307.

Furthermore, in order to prevent the scanning device 10 from erroneously judging a user's behavior to mistakenly switch on the image sensor 210 of the scanning device 10, this embodiment further excludes the behavior of the user to make the predetermined path of the scanning device 10 precisely. Specifically, Step 302 further includes several detailed steps as follows. First, motion trajectory data of the scanning device 10 is collected, next, a determination is made as to whether successive linear acceleration values of the motion trajectory data have periodic varieties, for example, a severe oscillation caused as the scanning device 10 drops or collides. If so, then it is decided that the scanning device 10 is not moved along the predetermined path.

In addition, step 302 further includes several detailed steps as follows. First, motion trajectory data of the scanning device 10 is collected, next, a determination is made as to whether the motion trajectory data continually and increasingly rises and then suddenly drops to zero, that is, to whether a last one of the successive linear acceleration values is zero. If so, then it is decided that the scanning device 10 is not moved along the predetermined path.

In other embodiments, before Step 301 above, the scanning device 10 of the disclosure further provides an automatic trigger learning function. In this embodiment, although the above-mentioned judgment algorithm has been pre-programmed and built in the scanning device 10 already before leaving the factory, in order to meet the needs of the user using other special triggering actions, the user may also enable the scanning device 10 to learn other predetermined path in an automatic learning mode through the external device 300. More specifically, several detailed steps are included before step 301 as follows. The motion trajectory of the scanning device 10 is collected repeatedly. The common characteristics of the motion trajectories are analyzed and matched to define the aforementioned predetermined paths.

For example, the setting action of the automatic trigger learning function includes sequential steps as follows. 1. Turning on the automatic learning mode; 2. Rendering the user to repeat the triggering actions 10 times in accordance with his/her custom action; 3. enabling a recorder disposed inside the scanning device 10 to record the motion trajectory data detected by the 10-times triggering actions, and analyze them to extract the commonality of the 10-times triggering actions; 4. Performing the re-test mode in which the user makes the same actions three times again for confirming whether the trigger actions meet the demands of the user; 5. Finishing adding/deleting the setting action.

Furthermore, in another option of Step 305 in this embodiment, the scanning device 10 does not directly transfer the barcode data to the external device 300, and the scanning device 10 stores them into the recorder in batches instead. Next, the scanning device 10 transmits the scanned barcode data in the recorder to the external device 300 synchronously through the wireless transmission device 220 when it is determined that the switch-off action is detected in Step 306.

In this embodiment, besides the scanning device 10 can be automatically triggered by a specific motion trajectory with the user's hand, the scanning device 10 can also use the motion trajectory of different gestures of the user's hand (e.g., tap 1-3 times, turn clockwise/counterclockwise, slowly/quickly, or various combinations of the above) to perform the following tasks. For example, pairing the scanning device 10 to the external device 300 with a gesture action; initiating data upload with a gesture action; launching an application for the external device 300 with a gesture action; completing a receipt report with a gesture action; and completing a dispatch report with a gesture action.

Thus, through the construction of the embodiments above, the disclosure not only can totally save the operation time that a scanning button of the scanning device being pressed multiple times spends, thereby improving the work efficiency and reducing the processing time of the personnel, but also meet the requirements to free both hands at the same time during the scanning process.

Although the disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A method of automatically triggering a scanning operation of a scanning device through a specific motion trajectory, comprising:
   when the scanning device is moved along the specific motion trajectory, sensing and determining whether the specific motion trajectory of the scanning device matches a predetermined path;
   when it is determined that the specific motion trajectory of the scanning device matches the predetermined path, responsive to determining that the specific motion trajectory of the scanning device matches the predetermined path, automatically switching on a barcode image sensor of the scanning device for scanning barcode images;
   sensing another specific motion trajectory of the scanning device and determining whether the scanning device is moved down to a lower position according to the another specific motion trajectory; and
   when it is determined that the scanning device is moved down to the lower position and not lifted again in a period of time, automatically switching off the barcode image sensor of the scanning device.

2. The method of claim 1, further comprising, when sensing and determining whether the specific motion trajectory of the scanning device matches the predetermined path:
   determining whether the scanning device is moved upwardly to a specific position and moved transversely to a code-scanning position from the specific position; and
   when it is determined that the scanning device is moved upwardly to the specific position and moved transversely to the code-scanning position from the specific position, deciding that the scanning device is moved along the predetermined path.

3. The method of claim 2, further comprising, when sensing and determining whether the specific motion trajectory of the scanning device matches the predetermined path:
   sequentially collecting a first specific motion trajectory data and a second specific motion trajectory data of the scanning device;
   determining whether the first specific motion trajectory data has a Z-axial linear acceleration component, wherein the Z-axial linear acceleration component is a positive number;
   when it is determined that the first specific motion trajectory data has the Z-axial linear acceleration component, determining whether the second specific motion trajectory data has a horizontal axial linear acceleration component; and
   when it is determined that the second specific motion trajectory data has the horizontal axial linear acceleration component, deciding that the scanning device is moved along the predetermined path.

4. The method of claim 2, further comprising, when sensing and determining whether the specific motion trajectory of the scanning device matches the predetermined path:
   sequentially collecting a first specific motion trajectory data and a second specific motion trajectory data of the scanning device;

determining whether the first specific motion trajectory data has a horizontal axial angular acceleration component, wherein the horizontal axial angular acceleration component is a positive number;

when it is determined that the first specific motion trajectory data has the horizontal axial angular acceleration component, determining whether the second specific motion trajectory data has a Z-axial linear acceleration component; and when it is determined that the second specific motion trajectory data has the Z-axial linear acceleration component, deciding that the scanning device is moved along the predetermined path.

5. The method of claim 1, further comprising, when it is determined that the scanning device is moved down to the lower position and not lifted again in the period of time:

collecting specific motion trajectory data of the scanning device;

determining whether the specific motion trajectory data has a Z-axial linear acceleration component, wherein the Z-axial linear acceleration component is a negative number;

when it is determined that the specific motion trajectory data has the Z-axial linear acceleration component, determining whether the scanning device is stationary during the period of time; and when it is determined that the scanning device is stationary in the period of time, switching off the barcode image sensor of the scanning device.

6. The method of claim 1, further comprising, when sensing and determining whether the specific motion trajectory of the scanning device matches the predetermined path:

collecting specific motion trajectory data of the scanning device;

determining whether a plurality of successive linear acceleration values of the specific motion trajectory data have periodic varieties, or a last one of the successive linear acceleration values is zero; and when it is determined that the successive linear acceleration values of the specific motion trajectory data have periodic varieties, or the last one of the successive linear acceleration values is zero, deciding that the scanning device is not moved along the predetermined path.

7. The method of claim 1, further comprising:

repeatedly collecting motion trajectories of the scanning device multiple times before determining whether the scanning device is moved along the predetermined path; and analyzing the motion trajectories of the scanning device to match out a common characteristic of the motion trajectories of the scanning device so as to define the predetermined path.

8. The method of claim 1, further comprising:

sensing ambient lights to determine whether an ambient light intensity of the ambient lights conforms to a predetermined range after the barcode image sensor of the scanning device is switched on; and when it is determined that the ambient light intensity does not conform to the predetermined range, switching on a fill light of the scanning device for filling lights.

\* \* \* \* \*